(12) United States Patent
Wingett et al.

(10) Patent No.: US 7,119,520 B2
(45) Date of Patent: Oct. 10, 2006

(54) ENERGY STORAGE FLYWHEEL TEST CONTROL SYSTEM

(75) Inventors: Paul T. Wingett, Mesa, AZ (US); Sharon K. Brault, Chandler, AZ (US); George J. Klupar, Phoenix, AZ (US); Calvin C. Potter, Mesa, AZ (US)

(73) Assignee: Honeywell International, Inc., Morristown, NJ (US)

( * ) Notice: Subject to any disclaimer, the term of this patent is extended or adjusted under 35 U.S.C. 154(b) by 138 days.

(21) Appl. No.: 10/793,545

(22) Filed: Mar. 3, 2004

(65) Prior Publication Data

US 2005/0206351 A1    Sep. 22, 2005

(51) Int. Cl.
*H02P 9/00* (2006.01)
*H02H 3/17* (2006.01)

(52) U.S. Cl. .......................................... 322/44; 361/31
(58) Field of Classification Search .................. 322/44; 361/31
See application file for complete search history.

(56) References Cited

U.S. PATENT DOCUMENTS

| | | | | |
|---|---|---|---|---|
| 3,585,473 A * | 6/1971 | Huxtable et al. | ........... | 318/140 |
| 3,659,172 A * | 4/1972 | Kuniaki et al. | ............ | 318/467 |
| 3,818,296 A * | 6/1974 | Torii | ........................... | 318/247 |
| 3,974,566 A * | 8/1976 | Pilatowicz | ................... | 30/382 |
| 4,152,833 A * | 5/1979 | Phillips | ....................... | 30/382 |
| 4,426,606 A | 1/1984 | Suita et al. | ................. | 318/375 |
| 4,612,494 A * | 9/1986 | Kawamura | ..................... | 322/4 |
| 4,841,212 A | 6/1989 | Matsushita et al. | ......... | 318/607 |
| 4,870,310 A | 9/1989 | Triplett | ........................ | 310/74 |
| 4,885,491 A | 12/1989 | Hiyama et al. | ............. | 310/90.5 |
| 4,908,553 A * | 3/1990 | Hoppie et al. | .............. | 318/382 |
| 5,040,088 A * | 8/1991 | Harrington et al. | ........... | 361/31 |
| 5,050,711 A * | 9/1991 | Sawato | ....................... | 188/164 |
| RE34,159 E * | 1/1993 | Harrington et al. | ........... | 361/31 |
| 5,234,083 A * | 8/1993 | Lee | .............................. | 188/267 |
| 5,311,062 A * | 5/1994 | Farkas | ........................ | 290/4 R |
| 5,408,166 A * | 4/1995 | Yang | .......................... | 318/530 |
| 5,434,454 A * | 7/1995 | Farkas | ........................ | 290/4 R |
| 5,469,031 A | 11/1995 | Chorey | ........................ | 318/375 |
| 5,611,505 A * | 3/1997 | Smay | ........................... | 244/165 |
| 5,708,312 A | 1/1998 | Rosen et al. | ................... | 310/90 |
| 5,747,907 A | 5/1998 | Miller | .......................... | 310/90 |
| 5,821,651 A | 10/1998 | Lansberry et al. | ............. | 310/74 |
| 5,828,195 A | 10/1998 | Zalesski | ...................... | 318/366 |
| 6,084,325 A * | 7/2000 | Hsu | ............................. | 310/74 |
| 6,144,128 A | 11/2000 | Rosen | ......................... | 310/74 |
| 6,262,505 B1 | 7/2001 | Hockney et al. | ........... | 310/90.5 |
| 6,346,757 B1 | 2/2002 | Shinozaki | .................. | 310/90.5 |
| 6,369,532 B1 | 4/2002 | Koenen et al. | .............. | 318/150 |
| 6,386,332 B1 * | 5/2002 | Daniel | ........................ | 188/71.1 |
| 6,492,741 B1 * | 12/2002 | Morimoto et al. | ........ | 290/40 C |
| 6,566,775 B1 * | 5/2003 | Fradella | ..................... | 310/90.5 |
| 6,593,713 B1 * | 7/2003 | Morimoto et al. | .......... | 318/139 |
| 6,639,370 B1 * | 10/2003 | Gabrys | ....................... | 318/161 |

(Continued)

*Primary Examiner*—Darren Schuberg
*Assistant Examiner*—Pedro J. Cuevas
(74) *Attorney, Agent, or Firm*—Ingrassia Fisher & Lorenz

(57) ABSTRACT

A system and method for removing energy from the rotating group in an energy storage flywheel system during flywheel system testing includes one or more sensors is operable to sense operational parameters of the energy storage flywheel and to supply a sensor signals representative thereof. A primary control circuit is coupled to receive the sensor signals and, in response thereto, selectively supplies a primary brake activation signal to a brake. The brake, in response to the brake activation signal, selectively supplies a brake force to the energy storage flywheel.

30 Claims, 2 Drawing Sheets

U.S. PATENT DOCUMENTS 6,745,873 B1 * 6/2004 Chen .................. 188/24.11
6,794,777 B1 * 9/2004 Fradella .................. 310/74
6,930,458 B1 * 8/2005 Akiyama et al. ............ 318/376
6,995,529 B1 * 2/2006 Sibley .................. 318/161

* cited by examiner

ENERGY STORAGE FLYWHEEL TEST CONTROL SYSTEM

TECHNICAL FIELD

The present invention relates to energy storage flywheel systems and, more particularly, to a system and method to rapidly dissipate the energy in an energy storage flywheel system during testing, if component or subsystem deterioration is sensed.

BACKGROUND

Many satellites and other spacecraft, as well as some terrestrial stationary and vehicle applications, such as sea-going vessels, can include one or more energy storage flywheel systems to provide both a backup power source and to provide attitude control for the vehicle. In such systems, each flywheel system is controlled and regulated to balance the electrical demand in the vehicle electrical distribution system, and may also be controlled in response to programmed or remote attitude (or torque) commands received by a main controller in the vehicle.

Many energy storage flywheel systems include one or more components that are rotationally mounted within a housing assembly. These components, which may be referred to as the rotating group, include, for example, an energy storage flywheel, a motor/generator, and a shaft. In particular, the energy storage flywheel and motor/generator may be mounted on the shaft, which may in turn be rotationally mounted in the housing assembly via one or more bearing assemblies. In many instances, the shaft is rotationally mounted using one or more primary bearing assemblies, and one or more secondary, or back-up, bearing assemblies. For example, in many satellite and spacecraft applications, the flywheel system may include one or more magnetic bearing assemblies that function as the primary bearing assemblies, and one or more mechanical bearing assemblies that function as the secondary bearing assemblies.

The rotating group in an energy storage flywheel system may rotate at several thousand revolutions per minute (rpm) during operation. For example, in some applications, the rotating group may reach rotational speeds of up to 100,000 rpm. Though highly unlikely, it is possible that one or more components or subsystems that make up the energy storage flywheel system may deteriorate, or otherwise become inoperable, which could result in damage to other components and subsystems.

To reduce the likelihood of such component or subsystem deterioration when placed in its end-use environment, energy storage flywheel systems are typically rotationally tested and certified in a test facility. During this testing, it is also possible, though highly unlikely, that one or more components or subsystems that make up the energy storage flywheel system may deteriorate or become inoperable.

Hence, there is a need for a system and method that will stop energy storage flywheel system operation during system testing if component or subsystem deterioration is sensed. Namely, a system and method that will remove energy from the rotating group in the event one or more energy storage flywheel system components or subsystems is sensed to be deteriorating, and/or a system and method that is configured to reduce the likelihood of falsely removing the energy from the rotating group. The present invention addresses one or more of these needs.

BRIEF SUMMARY

The present invention provides a system and method for removing energy from the rotating group in an energy storage flywheel system during flywheel system testing if component or subsystem deterioration is sensed.

In one embodiment, and by way of example only, an energy storage flywheel test control system includes a flywheel housing, an energy storage flywheel, a sensor, a primary control circuit, and a brake. The energy storage flywheel is rotationally mounted in the flywheel housing. The sensor is disposed within the flywheel housing, and is operable to sense an operational parameter of the energy storage flywheel and to supply a sensor signal representative thereof. The primary control circuit is coupled to receive the sensor signal and is operable, in response thereto, to selectively supply a primary brake activation signal. The brake is coupled to receive the brake activation signal and is operable, in response thereto, to selectively supply a brake force to the energy storage flywheel.

In another exemplary embodiment, a method of controlling operation of an energy storage flywheel system having at least a rotating energy storage flywheel includes sensing at least one parameter representative of energy storage flywheel system operability. Based at least in part on the at least one sensed parameter, a determination is made as to whether the energy storage flywheel system is operating properly. If it is determined that the energy storage flywheel system is not operating properly, a brake force is supplied to at least a portion of the energy storage flywheel system, to thereby stop the rotation of the energy storage flywheel.

Other independent features and advantages of the preferred test control system and method will become apparent from the following detailed description, taken in conjunction with the accompanying drawings which illustrate, by way of example, the principles of the invention.

DETAILED DESCRIPTION OF A PREFERRED EMBODIMENT

Before proceeding with a detailed description of an exemplary preferred embodiment of an energy storage flywheel containment vessel, for completeness a brief description of an exemplary energy storage flywheel system, which may be inserted into the exemplary containment vessel, will first be described.

Figure 1:
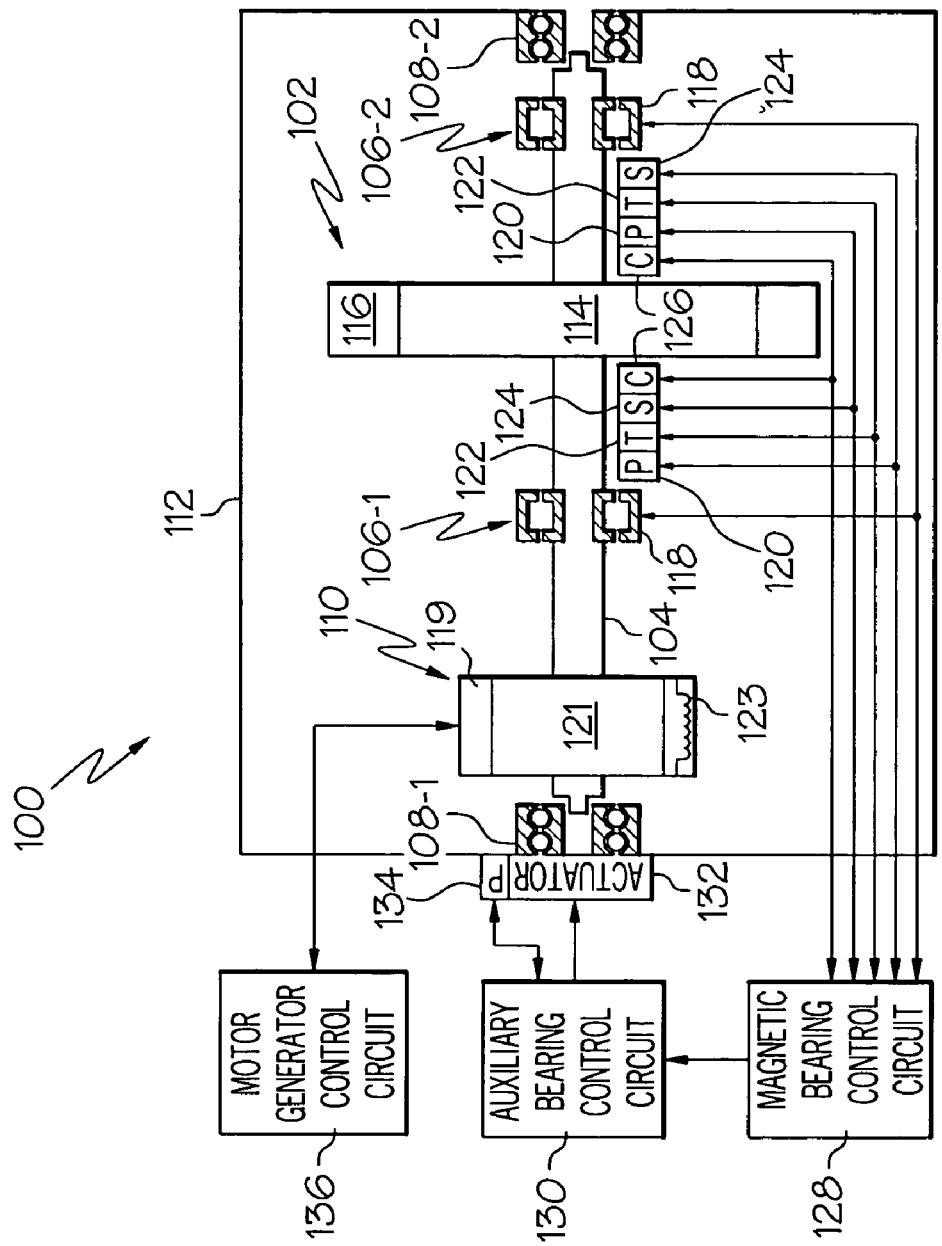
FIG. 1 is a simplified schematic representation of an exemplary energy storage flywheel system.

A simplified schematic representation of an energy storage flywheel system 100 is depicted in FIG. 1. In the depicted embodiment, the energy storage flywheel system 100 includes an energy storage flywheel 102, a shaft assembly 104, a plurality of primary bearing assemblies 106, a plurality of auxiliary bearing assemblies 108, and a motor/generator 110, all of which are preferably mounted within a housing assembly 1112. It will be appreciated that the internal portion of the housing assembly 112, during operation of the system 100, is preferably placed at a vacuum to minimize aerodynamic losses. It will additionally be appreciated that if the energy storage flywheel system 100 is installed in a natural vacuum environment, such as in space applications, then the housing assembly 112 internals need not be at a vacuum.

The energy storage flywheel 102 may be constructed in any one of numerous configurations and of any one of numerous materials. In the depicted embodiment, the energy storage flywheel 102 includes a hub 114 and a flywheel rim 116. The hub 114 is preferably constructed of a high-strength metal alloy, and is mounted on the shaft assembly 104. The hub 114 may be constructed in any one of numerous configurations including, for example, a solid configuration, a spoke-type configuration, or a combination thereof. The flywheel rim 116 is mounted on, and surrounds the hub 114 and is preferably constructed of a material having a high strength-to-density ratio such as, for example, filament wound carbon fiber.

The shaft assembly 104 is rotationally supported in the housing assembly 112. The rotational support for the shaft assembly 104 is provided by either the primary bearing assemblies 106, when activated, or the auxiliary bearing assemblies 108, when the primary bearing assemblies 106 are deactivated or not operating for one reason or another. In the depicted embodiment, and with respect to the view depicted in FIG. 1, a first primary bearing assembly 106-1 and a first auxiliary bearing assembly 108-1 are each positioned to the left of the flywheel shaft assembly 104, and a second primary bearing 106-2 and a second auxiliary bearing assembly 108-2 are each positioned to the right of the flywheel shaft assembly 104. It will be appreciated that the number primary 106 and secondary 108 bearing assemblies may be varied and that two of each is merely exemplary of a particular preferred embodiment.

In the depicted embodiment, the primary bearing assemblies 106 are magnetic bearing assemblies, which function to rotationally support or levitate, in non-contact fashion, the energy storage flywheel 102. In the depicted embodiment, the primary magnetic bearing assemblies 106 are implemented as active magnetic bearings, and each includes electromagnetic actuators 118 and one or more sensors such as, for example, position sensors 120, which may be configured to sense either or both radial and axial position, temperature sensors 122, speed sensors 124, and current sensors 126. The sensors 120–126 supply feedback signals representative of magnetic bearing assembly operability to a magnetic bearing controller 128. Although active magnetic bearings are described as being implemented in the system shown in FIG. 1, it will be appreciated that the primary magnetic bearing assemblies 106 could be configured to implement passive magnetic bearings. Alternatively, other types of bearing assemblies could be used to implement the primary bearing assemblies.

The magnetic bearing controller 128 receives position feedback signals from the magnetic bearing position sensors 120 and, in accordance with a control law, supplies current at the appropriate magnitude to the electromagnetic actuators 118. The electromagnetic actuators 118 in turn generate magnetic forces of the appropriate magnitude to appropriately position the shaft assembly 104. In the depicted embodiment, the magnetic bearing controller 128 also supplies the position feedback signals it receives to an auxiliary bearing controller 130. Moreover, as will be described in more detail further below, during testing of the energy storage flywheel system 100, the magnetic bearing controller 128 additionally supplies one or more signals representative of magnetic bearing assembly operability, and a signal representative of magnetic bearing controller operability, to one or more additional external control circuits.

The auxiliary bearing assemblies 108 are preferably mechanical, angular contact ball bearing assemblies, though it will be appreciated that various other types of mechanical bearing configurations could also be used. The auxiliary bearing assemblies 108 are used to rotationally support the shaft assembly 104 when the primary bearing assemblies 106 are inoperable, or are otherwise not capable of properly doing so. In the depicted embodiment, one of the auxiliary bearing assemblies 108-1 is coupled to the auxiliary bearing actuator 132. The auxiliary bearing actuator 132, in response to appropriate command signals supplied from the auxiliary bearing controller 130, is configured to move the auxiliary bearing assemblies 108 to either an engage position or a disengage position. In the disengage position, which is the normal position the auxiliary bearing assemblies 108 are in when the primary bearing assemblies 106 are activated, the auxiliary bearing assemblies 108 are disengaged from, and do not rotationally support, the flywheel shaft assembly 104. Rather, the shaft assembly 104 is rotationally supported by the primary bearing assemblies 106. Conversely, in the engage position the auxiliary bearing assemblies 108 engage, and rotationally support, the shaft assembly 104.

The auxiliary bearing controller 130, as was noted above, receives various signals representative of magnetic bearing assembly operability and various feedback signals from the auxiliary bearing assemblies 108. In response to these signals, the auxiliary bearing controller 130 supplies appropriate command signals to the auxiliary bearing actuator 132. An auxiliary position sensor 134 supplies a position signal representative of the position of the auxiliary bearing assemblies 106 to the auxiliary bearing controller 130. Moreover, as will be described further below, the auxiliary bearing position sensor 132 may also be used to supply the auxiliary bearing position signal to external equipment during energy storage flywheel system testing.

The motor/generator 110 is coupled to the shaft assembly 104, and includes a stator assembly 119 and a rotor assembly 121. The motor/generator 110 is configured to operate in either a motor mode or a generate mode. When operating in the motor mode, electrical energy is supplied to the motor/generator stator assembly 119 and, via normal motor action, the supplied electrical energy is converted to mechanical energy in the motor/generator rotor 110, which in turn rotates the shaft assembly 104 and thus the energy storage flywheel 102. Conversely, when it is operating in the generate mode, mechanical energy stored in the energy storage flywheel 102 is supplied to the shaft assembly 104, which is in turn supplied to the motor/generator rotor assembly 110. This mechanical energy is converted to electrical energy in the motor/generator stator assembly 119, via normal generator action, and is supplied external to the energy storage flywheel system 100. It is to be appreciated that the motor/generator stator 119 and rotor 121 assemblies may be any one of numerous stator and rotor assembly designs known in the art for performing their intended functions. In a particular preferred embodiment, however, the motor/generator 110 is constructed as a brushless, three-phase AC motor/generator. Thus, the motor/generator 110 includes a plurality of appropriately wound stator windings 123, which are depicted in FIG. 1 as a single winding for ease of illustration.

The mode and operation of the motor/generator 110 is controlled by a motor/generator controller 136. The motor/generator controller 136 is configured to selectively implement either a motor control law or a generator control law. When implementing the motor control law, the motor/generator controller 136 configures the motor/generator 110 to operate in the motor mode, and when implementing the generator control law, the motor/generator controller 136 configures the motor/generator 110 to operate in the generator mode.

Figure 2:
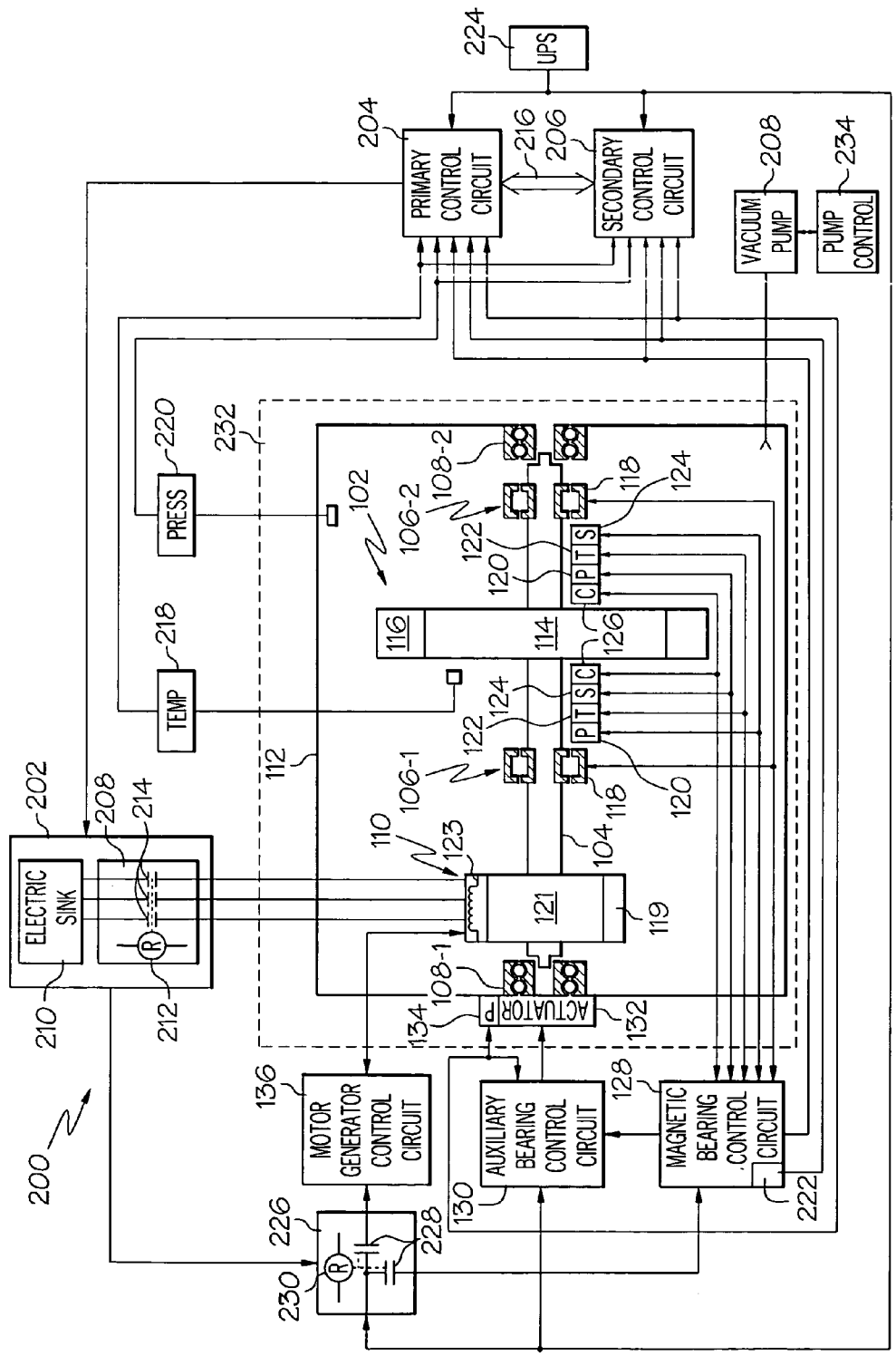
FIG. 2 is a simplified schematic representation of the system shown in FIG. 1 coupled to an exemplary embodiment of a test control system.

Turning now to FIG. 2, the exemplary energy storage flywheel system 100 shown in FIG. 1 is illustrated, once again in simplified schematic form, coupled to an exemplary embodiment of a test control system 200. The test control system 200, in the depicted embodiment, includes a brake 202, a primary control circuit 204, and a secondary control circuit 206. A vacuum pump 208 is additionally shown in FIG. 2 since, as was previously noted, the flywheel system housing assembly 112 is preferably maintained at a vacuum to reduce aerodynamic losses. During system tests, the vacuum pump 208 is controlled to maintain the flywheel system housing assembly 112 at a vacuum pressure of, for example, approximately $10^{-5}$ to $10^{-7}$ torr.

The brake 202 is in operable communication with the energy storage flywheel 102 and is configured, upon receipt of a brake activation control signal, to selectively apply a brake force to the energy storage flywheel 102. The circumstances under which the brake activation control signal is supplied to the brake 202 will be described in more detail further below. It will be appreciated that the brake 202 could be implemented as any one of numerous types of brakes including, for example mechanical, magnetic, hydraulic, or electrical, and could be implemented in any one of numerous configurations. However, in the depicted embodiment, the brake 202 is an electrical brake that is implemented as a dynamic brake, and includes a brake relay circuit 208 and an electric sink 210.

The brake relay circuit 208 functions similar to a switch, and is implemented as a three-phase relay 212 that controls a plurality of brake relay contacts 214. The brake relay contacts 214 are electrically coupled to selected motor/generator stator windings 123. When the brake relay contacts 214 are closed, the motor/generator stator windings 123 are electrically coupled to the electrical sink 210, thereby supplying a dynamic brake force to, and dissipating the energy in, the flywheel. It will be appreciated that the type and number of brake relay contacts 214 may vary, but in a particular preferred embodiment in which the motor/generator 110 is a three-phase motor/generator, there are preferably at least three brake relay contacts 214, one for each phase. It will additionally be appreciated that the electrical sink 210 may be implemented as any one of numerous types of electrical power dissipation devices. Preferably, however, it is implemented as a resistor bank.

The test control system 200 is preferably configured to implement a redundant logic scheme. With such a scheme, a brake activation control signal is supplied to the brake 202 only when the primary 204 and secondary 206 control circuits both agree that a brake activation control signal should be supplied. This redundant logic scheme can be implemented in any one of numerous ways, but in the depicted embodiment it is implemented by configuring the primary 204 and secondary 206 control circuits independent of one another, and further configuring each of the control circuits 204, 206 to monitor the same parameters representative of flywheel system operation. The primary 204 and secondary 206 control circuits, based on the monitored parameters, independently determine whether a brake activation signal should be supplied to the brake 202. More specifically, each control circuit 204, 206 independently determines if one or more of the operational parameters is outside of a predetermined range. If both control circuits 204, 206 agree that one or more of the same operational parameters are outside its predetermined range, then a brake activation control signal is supplied to the brake 202.

It will be appreciated that the method by which the primary 204 and secondary 206 control circuits agree that the same one or more operational parameters is outside its predetermined range may vary. In the depicted embodiment, the primary 204 and secondary 206 control circuits are in operable communication with one another via, for example, a communications data bus 216. If the secondary control circuit 206 determines that one or more flywheel system operational parameters are outside its predetermined range, it supplies one or more secondary brake activation control signals to the primary control circuit 204. If the primary control circuit 204 determines that one or more flywheel system operational parameters is outside its predetermined range, it additionally determines, based on the one or more secondary brake activation control signals supplied from the secondary control circuit 206, whether the two control circuits 204, 206 agree that one or more of the same operational parameters is outside its predetermined range. If the primary control circuit 204 determines that the two control circuits 204, 206 are in agreement, the primary control circuit 204 supplies a primary brake activation control signal to the brake 202.

The flywheel system operational parameters that are monitored by the primary 204 and secondary 206 control circuits are preferably indicative of flywheel system operability. It will be appreciated that the particular operational parameters indicative of flywheel system operability may vary, but in the depicted embodiment include auxiliary bearing position, flywheel rotor temperature, housing pressure, and magnetic bearing operability. Thus, the flywheel test control system 200 additionally includes a plurality of sensors. One or more of these sensors may be dedicated test control system sensors that are used only during testing of the energy storage flywheel system 100. Alternatively, one or more of the sensors may be part of the energy storage flywheel system 100 that are used to control the energy storage flywheel system 100 during non-test operations, and that are additionally used to supply signals to the test control system 200 during test operations. In the depicted embodiment, the sensors include the auxiliary bearing sensor 134, a rotor temperature sensor 218, and a housing pressure sensor 220, which are used to supply signals representative of auxiliary bearing position, flywheel rotor temperature, and housing pressure, respectively, to both the primary 204 and secondary 206 control circuits.

As FIG. 2 additionally shows, the magnetic bearing controller 128 is in operable communication with the primary 204 and secondary 206 test control circuits. The magnetic bearing controller 128, as was previously mentioned, is configured to supply one or more signals representative of magnetic bearing assembly operability and a signal representative magnetic bearing controller operability. In the depicted embodiment, the signals representative of magnetic bearing assembly operability include one or more of a signal representative of magnetic bearing current, a signal representative of magnetic bearing temperature, and a signal representative of magnetic bearing position. It will be appreciated that these are merely exemplary of the types of signals that may be used to indicate magnetic bearing assembly operability. It will additionally be appreciated that these signals may be supplied from various signal sources, other than the magnetic bearing controller 128, within the energy storage flywheel system 100.

The signal representative of magnetic bearing controller operability is generated by a watchdog timer 222 associated with the magnetic bearing controller 128. If the watchdog timer 222 is not reset, and times out, this is indicative of either a hardware or software failure or error in the magnetic bearing controller 128. In such an instance, the watchdog timer 222 will supply a signal to the primary 204 and secondary 206 control circuits, indicating that the magnetic bearing controller 128 is no longer functioning properly.

As FIG. 2 additionally shows, when the energy storage flywheel system 100 is coupled to the test control system 200, an uninterruptible power supply (UPS) 224 is preferably used to supply electrical power to at least portions of both the energy storage flywheel system 100 and the test control system 200. The UPS 224 is preferably used so that power supply anomalies, such as power surges, brown outs, or a complete loss of site power to the test facility, will not affect operation of the test control system 200. The UPS 224 may be any one of numerous types of power generating and supply devices such as, for example, an independently powered generator or a battery and appropriate power conditioning circuitry. In a particular preferred embodiment, the UPS 224 is configured so as to supply power to the control system 200 for at least 15 minutes. This amount of time will allow for a controlled shutdown of the energy storage flywheel system 100 at various rotational speeds.

In the depicted embodiment, it is seen that the UPS 224 supplies power to the primary 204 and secondary 206 control circuits, to the motor/generator controller 136, the magnetic bearing controller 128, and the auxiliary bearing controller 130. The power supplied from the UPS 224 to the motor/generator controller 136 and the magnetic bearing controller 128 is supplied via a motor/generator relay circuit 226. The motor/generator relay circuit 226 is in operable communication with the brake relay circuit 208. Upon receipt of a brake activation control signal, the brake relay circuit 208 electrically decouples the motor/generator controller 136 and magnetic bearing controller 128 from the UPS 224.

Similar to the brake relay circuit 208, the motor/generator relay circuit 226 may be implemented in any one of numerous ways. In the depicted embodiment, however, the motor/generator relay circuit 226 includes a plurality of contacts 228 that are controlled by a relay 230. The motor/generator relay circuit 226 is configured such that the contacts 228 are closed when the energy storage flywheel system 100 is operating properly. However, when the brake relay circuit 208 receives a brake activation control signal, the contacts 228 in the motor/generator relay circuit 226 open, and electrically decouple the motor/generator controller 136 and the magnetic bearing controller 128 from the UPS 224.

Having described the flywheel test control system 200, and its interface to the energy storage flywheel system 100, from a structural and configuration view point, a description of the overall function implemented by the flywheel test control system 200 will now be provided. In doing so, reference should be made to FIG. 2.

During tests of the energy storage flywheel system 100, the system 100, or at least portions thereof, are preferably disposed within a test containment vessel 232. The containment vessel 232 provides added protection to equipment and personnel in the highly unlikely event of a structural failure in the system 100 during high speed rotation. The vacuum pump 208, which in the depicted embodiment is controlled by a separate pump controller 234, is used to draw and maintain a predetermined vacuum magnitude within the flywheel housing assembly 112.

Once a desired vacuum magnitude is reached in the flywheel housing assembly, the energy storage flywheel system 100 may be tested by, for example, bringing the energy storage flywheel 102 up to full rotational speed. To do so, the magnetic controller 128 activates and controls the magnetic bearing assemblies 108, and the motor/generator controller 136 controls the motor/generator 110 in the motor mode, thereby spinning the energy storage flywheel 102 up to full rotational test speed. Once the energy storage flywheel 102 reaches the full rotational test speed, or while bringing the energy storage flywheel 102 up to the full rotational test speed, other portions of the energy storage flywheel system 100 may be tested.

While the energy storage flywheel system 100 is being tested, the test control system 200 is monitoring each of the above-mentioned parameters that are representative of energy storage flywheel system operability. Specifically, the primary control circuit 204 and the secondary control circuit 206, each receive signals representative of vacuum magnitude within the flywheel housing assembly 112, rotor temperature, auxiliary bearing assembly position, magnetic bearing assembly operability. If, during testing, both the primary 204 and secondary 206 control circuits agree that the same parameters have reached a predetermined magnitude, or if the primary 204 and secondary 206 control circuits both receive a signal from the magnetic bearing controller watchdog timer 222 indicating the magnetic bearing controller 128 is no longer functioning properly, the primary control circuit 204 supplies a primary brake activation control signal to the brake relay circuit 208.

In response to the primary brake activation control signal, the three-phase brake relay 212 causes the associated brake contacts 214 to close, and the contacts 228 in the motor/generator relay circuit 226 to open. As a result, the motor/generator stator windings 121 are electrically coupled to the electrical sink 210, and power is removed from the both motor/generator controller 136 and the magnetic bearing controller 128. This in turn causes the motor/generator 110 to apply a dynamic brake force to the energy storage flywheel 102, and the auxiliary bearing controller 130 to command the auxiliary bearing actuator 132 to move the auxiliary bearing assemblies 108 into the engaged position.

The test control system 200 described herein provides a quick and relatively easy way to remove energy from the rotating group in an energy storage flywheel system during flywheel system testing, if component or subsystem deterioration is sensed. It will be appreciated that the embodiment described and depicted herein is merely exemplary of a particular preferred embodiment, and that the system 200 could be implemented in various other configurations. For example, the system 200 could be implemented with only a single control circuit, such as the primary control circuit. In such instances, the system 200 would not implement the above-described redundant logic scheme. In another exemplary implementation, the system 200 could be configured as a dual-channel, fully redundant system. In such an implementation, the system 200 would include redundant sources of flywheel system operability, such as dual sensors, coupled one each to each of the control circuits 204, 206.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An energy storage flywheel test control system, comprising:
a flywheel housing;
an energy storage flywheel rotationally mounted in the flywheel housing;
a sensor disposed within the flywheel housing, the sensor operable to sense an operational parameter of the energy storage flywheel and to supply a sensor signal representative thereof;
a primary control circuit coupled to receive the sensor signal and operable, in response thereto, to selectively supply a primary brake activation signal; and
a brake coupled to receive the brake activation signal and operable, in response thereto, to supply a brake force to the energy storage flywheel at least until the energy storage flywheel stops rotating.

2. The system of claim 1, further comprising:
a secondary control circuit coupled to receive the sensor signal and operable, in response thereto, to selectively supply a secondary brake activation signal,
wherein the primary control circuit is coupled to receive the secondary brake activation signal and is further operable, in response thereto, to selectively supply the primary brake activation signal.

3. The system of claim 2, wherein:
the system comprises a plurality of sensors each operable to sense an operational parameter of the energy storage flywheel and supply a sensor signal representative thereof;
the secondary control circuit is coupled to receive the sensor signals from each of the plurality of sensors and is operable, in response thereto, to selectively supply the one or more secondary brake activation signals;
the primary control circuit is coupled to receive the sensor signals from each of the plurality of sensors and the one or more secondary brake activation signals and is operable, in response thereto, to selectively supply the primary brake activation signal.

4. The system of claim 3, wherein the one or more sensors include:
a temperature sensor operable to sense a temperature of at least a portion of the energy storage flywheel and supply a temperature signal representative thereof; and
a pressure sensor operable to sense a pressure within the flywheel housing and supply a pressure signal representative thereof.

5. The system of claim 3, wherein:
the secondary control circuit is configured to supply the one or more secondary brake activation control signals when one or more of the sensor signals indicate that one or more of the energy storage flywheel system operational parameters is outside a predetermined range; and
the primary control circuit is configured to supply the primary brake activation signal when the one or more of the same sensor signals indicate that one or more of the energy storage flywheel system operational parameters is outside the predetermined range.

6. The system of claim 1, further comprising:
a motor/generator coupled to the energy storage flywheel and configured to selectively operate in either (i) a motor mode, whereby electrical energy is converted to rotational energy and supplied to the energy storage flywheel, or (ii) a generator mode, whereby rotational energy is received from the energy storage flywheel assembly and convened to electrical energy; and
a motor/generator controller in operable communication with the motor/generator and operable to control the motor/generator in either the motor mode or the generator mode,
wherein the brake is further operable, upon receipt of the primary brake activation signal, to deenergize the motor/generator controller.

7. The system of claim 6, wherein the motor/generator includes a plurality of windings, and wherein the brake comprises:
an electrical sink; and
a switch coupled to receive the primary brake activation signal and operable, in response thereto, to couple at least a portion of the motor/generator windings to the electrical sink, to thereby supply the brake force to the energy storage flywheel.

8. The system of claim 7, wherein the switch comprises a plurality of electrical contacts.

9. The system of claim 7, wherein the electrical sick comprises one or more resistors.

10. The system of claim 1, further comprising:
one or more primary magnetic bearing assemblies mounted in the housing assembly, each primary magnetic bearing assembly adapted to be selectively activated and deactivated, and configured, when activated, to rotationally mount the energy storage flywheel assembly in non-contact manner; and
a magnetic bearing controller adapted to receive bearing command signals and operable, in response thereto, to supply at least the activation and deactivation signals to each of the primary magnetic bearings,
wherein the brake is further operable, upon receipt of the primary brake activation signal, to deenergize the magnetic bearing controller.

11. The system of claim 10, further comprising:
one or more secondary bearing assemblies movably mounted in the housing assembly and configured to be selectively rotationally support the energy storage flywheel; and
a secondary bearing actuator assemblies coupled to one or more of the secondary bearing assemblies, the secondary bearing actuator assembly adapted to receive actuator control signals and operable, in response thereto, to move the one or more secondary bearing assemblies to one of (i) an engage position, in which the one or more secondary bearing assemblies rotationally support the shaft, and (ii) a disengage position, in which the one or more secondary bearing assemblies do not rotationally support the shaft.

12. The system of claim 11, further comprising:
one or more secondary bearing position sensors configured to supply position signals representative of a position of the one or more secondary bearing assemblies to the primary control circuit as the sensor signal representative of the operational parameter of the energy storage flywheel.

13. The system of claim 1, further comprising:
a vacuum pump in fluid communication with the flywheel housing and operable to draw a vacuum pressure in the flywheel housing; and
a pressure sensor configured to sense pressure within the flywheel housing and supply a pressure signal representative thereof to the primary control circuit as the sensor signal representative of the operational parameter of the energy storage flywheel.

14. An energy storage flywheel test control system, comprising:
a flywheel housing;
an energy storage flywheel rotationally mounted in the housing;
a sensor disposed within the flywheel housing, the sensor operable to sense an operational parameter of the energy storage flywheel and to supply a sensor signal representative thereof;
a secondary control circuit coupled to receive the sensor signal and operable, in response thereto, to selectively supply one or more secondary brake activation signals;
a primary control circuit coupled to receive the sensor signal and the one or more secondary brake control signals and operable, in response thereto, to selectively supply a primary brake activation signal; and
a brake coupled to receive the primary brake activation signal and operable, in response thereto, to supply a brake force to the energy storage flywheel assembly at least until the energy storage flywheel stops rotating.

15. The system of claim 14, wherein:
the system comprises a plurality of sensors each operable to sense an operational parameter of the energy storage flywheel and supply a sensor signal representative thereof;
the secondary control circuit is coupled to receive the sensor signals from each of the plurality of sensors and is operable, in response thereto, to selectively supply the one or more secondary brake activation signals;
the primary control circuit is coupled to receive the sensor signals from each of the plurality of sensors and the one or more secondary brake activation signals and is operable, in response thereto, to selectively supply the primary brake activation signal.

16. The system of claim 15, wherein the one or more sensors include:
a temperature sensor operable to sense a temperature of at least a portion of the energy storage flywheel and supply a temperature signal representative thereof; and
a pressure sensor operable to sense a pressure within the flywheel housing and supply a pressure signal representative thereof.

17. The system of claim 15, wherein:
the secondary control circuit is configured to supply the one or more secondary brake activation control signals when one or more of the sensor signals indicate that one or more of the energy storage flywheel operational parameters is outside a predetermined range; and
the primary control circuit is configured to supply the primary brake activation signal when the one of more of the same sensor signals indicate that one or more of the energy storage flywheel operational parameters is outside the predetermined range.

18. The system of claim 14, further comprising:
a motor/generator coupled to the energy storage flywheel and configured to selectively operate in either (i) a motor mode, whereby electrical energy is converted to rotational energy and supplied to the energy storage flywheel, or (ii) a generator mode, whereby rotational energy is received from the energy storage flywheel and converted to electrical energy; and
a motor/generator controller in operable communication with the motor/generator and operable to control the motor/generator in either the motor mode or the generator mode,
wherein the brake is further operable, upon receipt of the primary brake activation signal, to deenergize the motor/generator controller.

19. The system of claim 18, wherein the motor/generator includes a plurality of windings, and wherein the brake comprises:
an electrical sink; and
a switch coupled to receive the primary brake activation signal and operable, in response thereto, to selectively couple at least a portion of the motor/generator windings to the electrical sink, to thereby supply the brake force to the energy storage flywheel.

20. The system of claim 19, wherein the switch comprises a plurality of electrical contacts.

21. The system of claim 19, wherein the electrical sink comprises one or more resistors.

22. The system of claim 14, further comprising:
one or more primary magnetic bearing assemblies mounted in the housing assembly, each primary magnetic bearing assembly adapted to be selectively activated and deactivated, and configured, when activated, to rotationally mount the energy storage flywheel in non-contact manner; and
a magnetic bearing controller adapted to receive bearing command signals and operable, in response thereto, to supply at least the activation and deactivation signals to each of the primary magnetic bearings,
wherein the brake is further operable, upon receipt of the primary brake activation signal, to deenergize the magnetic bearing controller.

23. The system of claim 22, further comprising:
one or more secondary bearing assemblies movably mounted in the housing assembly and configured to be selectively rotationally support the energy storage flywheel; and
a secondary bearing actuator assemblies coupled to one or more of the secondary bearing assemblies, the secondary bearing actuator assembly adapted to receive actuator control signals and operable, in response thereto, to move the one or more secondary bearing assemblies to one of (i) an engage position, in which the one or more secondary bearing assemblies rotationally support the shaft, and (ii) a disengage position, in which the one or more secondary bearing assemblies do not rotationally support the shaft.

24. The system of claim 23, further comprising:
one or more secondary bearing position sensors configured to supply position signals representative of a position of the one or more secondary bearing assemblies to the primary control circuit as the sensor signal representative of the operational parameter of the energy storage flywheel.

25. The system of claim 14, further comprising:
a vacuum pump in fluid communication with the flywheel housing and operable to draw a vacuum pressure in the flywheel housing; and
a pressure sensor configured to sense pressure within the flywheel housing and supply a pressure signal representative thereof to the primary control circuit as the sensor signal representative of the operational parameter of the energy storage flywheel.

26. An energy storage flywheel test control system, comprising:
a flywheel housing;
an energy storage flywheel rotationally mounted in the housing;

a sensor disposed within the flywheel housing, the sensor operable to sense an operational parameter of the energy storage flywheel and to supply a sensor signal representative thereof;

a motor/generator coupled to the energy storage flywheel and configured to selectively operate in either (i) a motor mode, whereby electrical energy is convened to rotational energy and supplied to the flywheel assembly, or (ii) a generator mode, whereby rotational energy is received from the energy storage flywheel and converted to electrical energy, the motor/generator including a plurality of windings;

a secondary control circuit coupled to receive the sensor signal and operable, in response thereto, to selectively supply one or more secondary brake activation signals;

a primary control circuit coupled to receive the sensor signal and the one or more secondary brake activation signals and operable, in response thereto, to selectively supply a primary brake activation signal;

an electrical sink; and a switch coupled to receive the primary brake activation signal and operable, in response thereto, to couple at least a portion of the motor/generator windings to the electrical sink, to thereby supply a dynamic brake force to the flywheel assembly at least until the energy storage flywheel stops rotating.

27. A method of controlling operation of an energy storage flywheel system having at least a rotating energy storage flywheel, comprising the steps of:

sensing at least one parameter representative of energy storage flywheel system operability;

determining whether the energy storage flywheel system is operating properly, based at least in part on the at least one sensed parameter; and if it is determined that the energy storage flywheel system is not operating properly, supplying a brake force to the energy storage flywheel at least until the energy storage flywheel stops rotating.

28. The method of claim 27, further comprising:

making at least two independent determinations as to whether the energy storage flywheel system is operating properly, based at least in part on the at least one sensed parameter.

29. The method of claim 28, further comprising:

supplying the brake force when each of the independent determinations indicates that the energy storage flywheel system is not operating properly.

30. The method of claim 27, further comprising:

sensing a plurality of parameters representative of energy storage flywheel system operability; and determining whether the energy storage flywheel system is operating properly, based at least in part on each of the plurality of sensed parameters.

* * * * *

UNITED STATES PATENT AND TRADEMARK OFFICE
CERTIFICATE OF CORRECTION

| | | |
|---|---|---|
| PATENT NO. | : 7,119,520 B2 | |
| APPLICATION NO. | : 10/793545 | |
| DATED | : October 10, 2006 | |
| INVENTOR(S) | : Wingett et al. | |

It is certified that error appears in the above-identified patent and that said Letters Patent is hereby corrected as shown below:

Column 1, add the following paragraph between the Title and Technical Field:

--STATEMENT REGARDING FEDERALLY SPONSORED RESEARCH OR DEVELOPMENT

This invention was made with government support under Agreement No. F29601-01-2-0046 awarded by the U.S. Air Force, Air Force Research Laboratory. The government has certain rights in this invention.--

Column 10, line 2, delete the word "assembly";
Column 10, line 2, "convened" should be changed to --converted--;
Column 10, line 21, "sick" should be changed to --sink--;
Column 10, line 29, delete the word "assembly".
Column 11, line 20, delete the word "assembly".

Signed and Sealed this

Twentieth Day of March, 2007

JON W. DUDAS
*Director of the United States Patent and Trademark Office*